Nov. 11, 1924.

J. H. COE 1,515,460

DISPLAY DEVICE

Filed March 21, 1923    4 Sheets-Sheet 1

Inventor

J. H. Coe,

By C. A. Snow & Co.

Attorneys

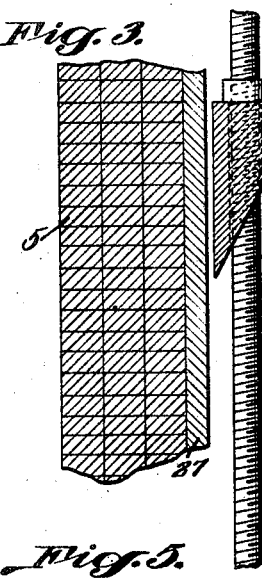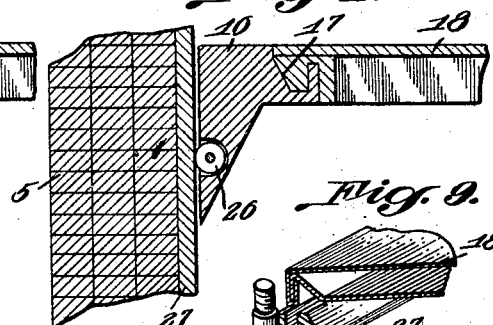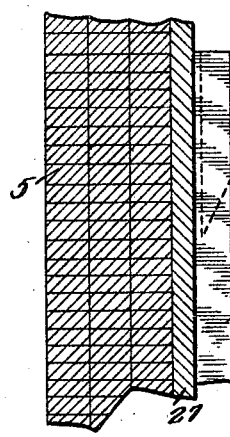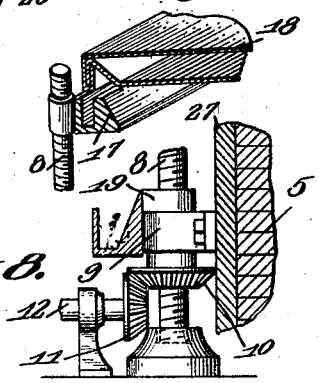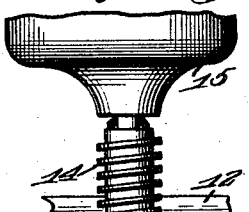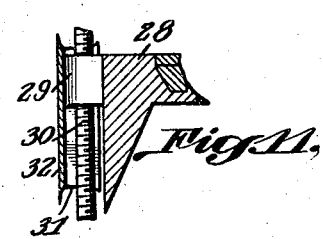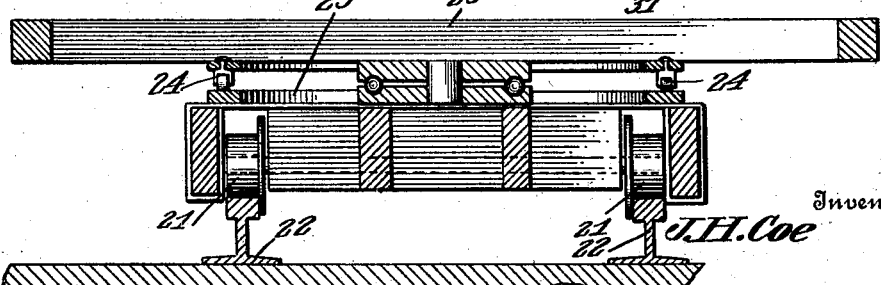

Nov. 11, 1924.
J. H. COE
1,515,460
DISPLAY DEVICE
Filed March 21, 1923  4 Sheets—Sheet 3
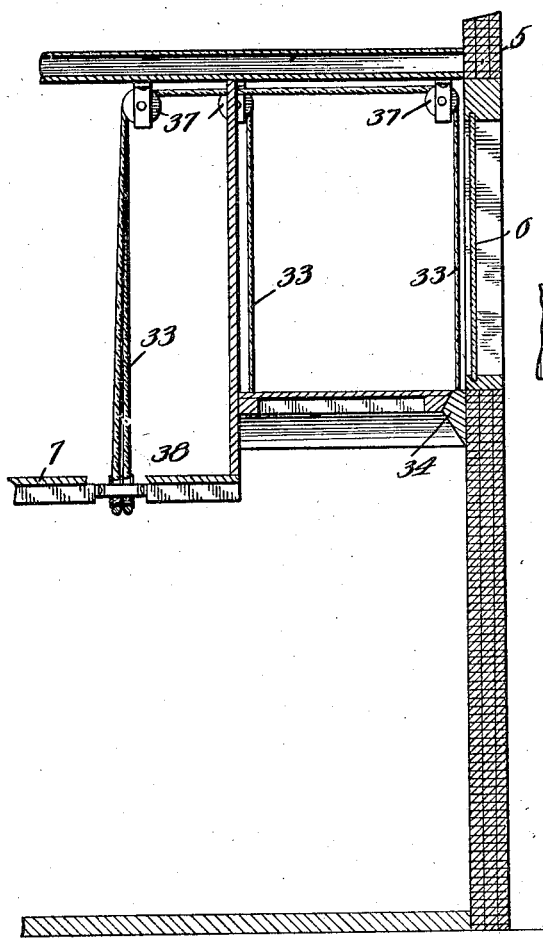
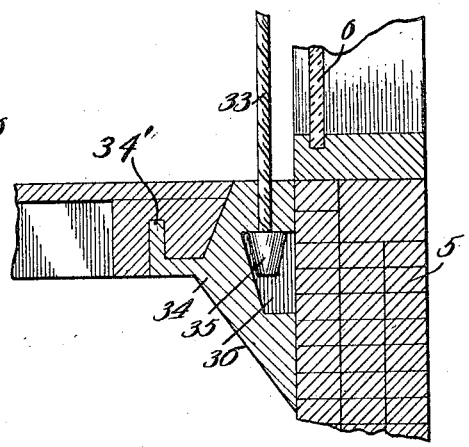
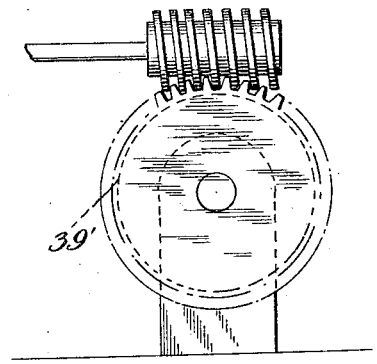
J.H. Coe, Inventor Nov. 11, 1924.  
J. H. COE  
DISPLAY DEVICE  
Filed March 21, 1923  
1,515,460  
4 Sheets-Sheet 4
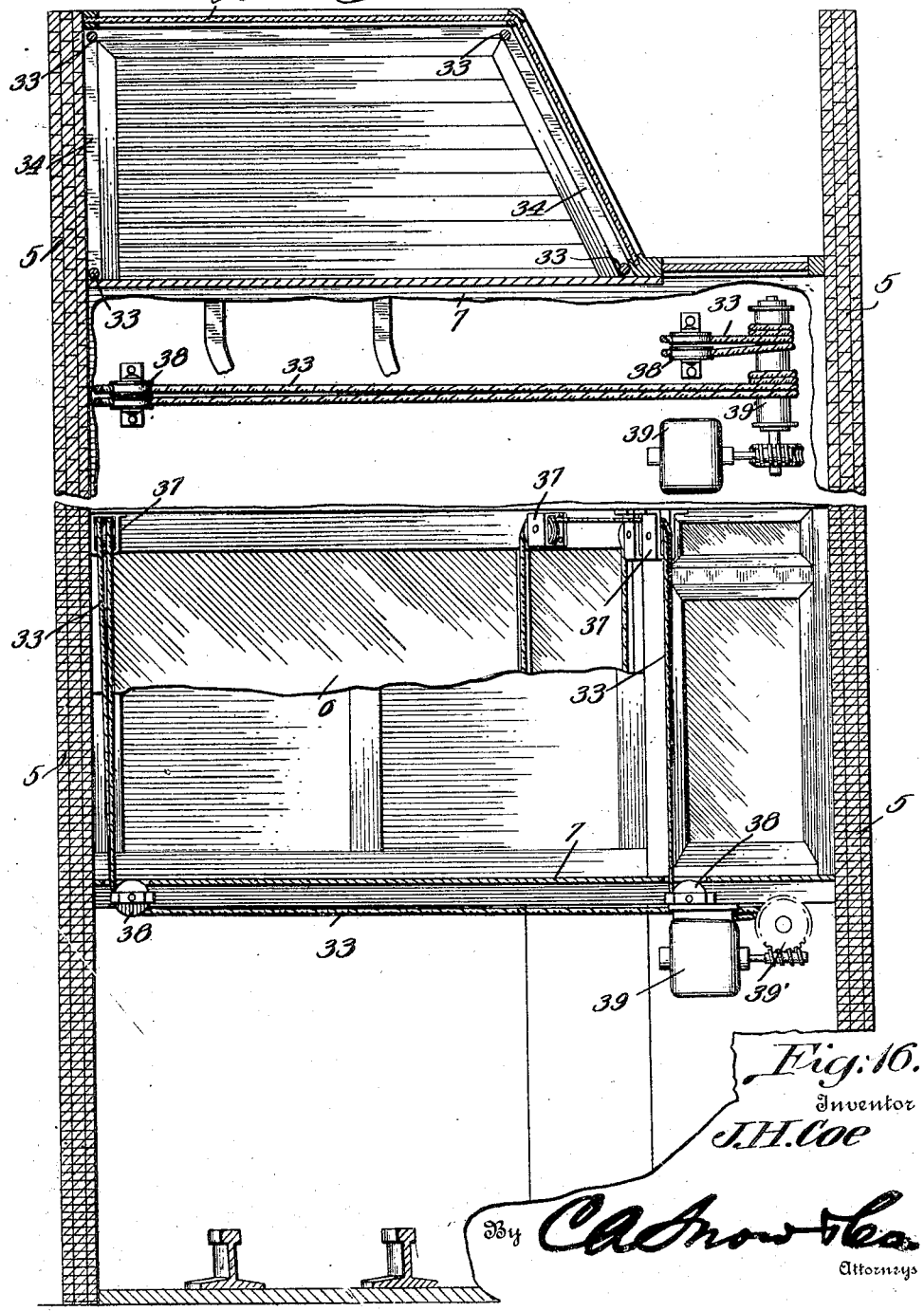

Patented Nov. 11, 1924.

1,515,460

UNITED STATES PATENT OFFICE.

JOSEPH H. COE, OF BURLINGTON, IOWA, ASSIGNOR OF ONE-THIRD TO EMIL F. HUNEKE AND ONE-THIRD TO GEORGE E. WHEELER, BOTH OF BURLINGTON, IOWA.

DISPLAY DEVICE.

Application filed March 21, 1923. Serial No. 626,599.

*To all whom it may concern:*

Be it known that I, JOSEPH H. COE, a citizen of the United States, residing at Burlington, in the county of Des Moines and State of Iowa, have invented a new and useful Display Device, of which the following is a specification.

This invention relates to display devices, and aims to provide novel means to facilitate the trimming of store display windows or the like.

The primary object of the invention is to provide removable platforms which may be readily and easily supplied with devices to be displayed at points above or below or remote from the window and moved to their proper display positions within the window.

Another object of the invention is to provide novel means for handling the platforms to facilitate the moving of the platforms and positioning them in their displaying positions in a window after they have been trimmed.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 3 is a fragmental detail view of one form of operating means;

Figure 4 is a fragmental sectional view of the operating means taken on a line at the rear of Figure 3;

Figure 5 is a fragmental sectional view disclosing guides for restricting lateral movement of the elevating means;

Figure 6 is a transverse sectional view through the truck employed in connection with the apparatus;

Figure 7 is a fragmental detail view disclosing the motor and driving worm;

Figure 8 is a fragmental detail view disclosing one of the lifting brackets and shafts for operating the same.

Figure 9 is a detail view disclosing a modified form of the platform and bracket shown in Figures 3 and 4.

Figure 10 is a sectional detail view through a modified form of bracket supporting means and its guide.

Figure 11 is a vertical sectional view therethrough;

Figure 12 is a vertical sectional view through another form of bracket elevating means;

Figure 13 is a detail view setting forth the manner of connecting elevating cables to the bracket;

Figure 14 is a detail view of the worm and gear for operating the drum on which the flexible devices are wound; and Figure 15 is a transverse sectional view through a display window;

Figure 16 is a vertical sectional view disclosing the cables as operating from the ceiling of the window.

Figure 1:
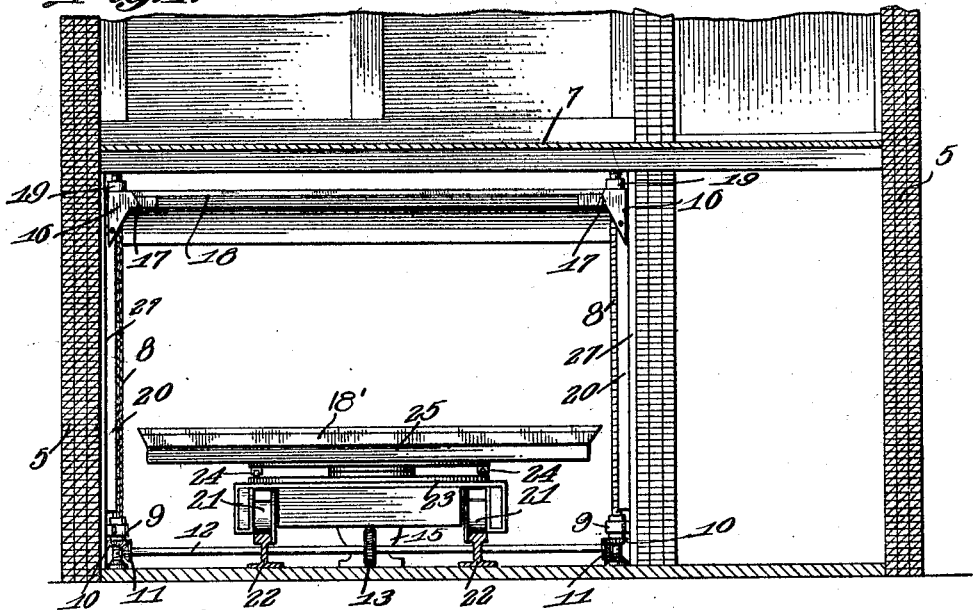
Figure 1 is a rear elevational view disclosing a platform and the elevating means as positioned below the window proper.

Referring to the drawings in detail, the wall of a building is indicated generally by the reference character 5, the display window forming a part of the building being indicated at 6.

The level or floor of the display window is indicated at 7 to which level the movable bracket members or platform supports are moved.

Disposed intermediate the width of the display window in which the apparatus is located, are vertically disposed threaded shafts 8 held in such vertical positions by means of supporting bearings 9. At the lower ends of these shafts 8 are arranged beveled pinions 10 that mesh with the beveled pinions 11 formed at the ends of the horizontal power shaft 12, the power shaft 12 being supplied with a gear 13 intermediate its ends, which gear meshes with the worm 14 operated by a suitable motor indicated at 15. The supporting brackets employed in connection with these shafts 8 are relatively long vertically as indicated at 16, which brackets are provided with inclined edges 17 to cooperate with the inclined edges of the removable platform 18 so that when the platform is positioned on its supporting brackets, lateral movement of the platform with respect to its brackets will be prevented.

Figure 2:
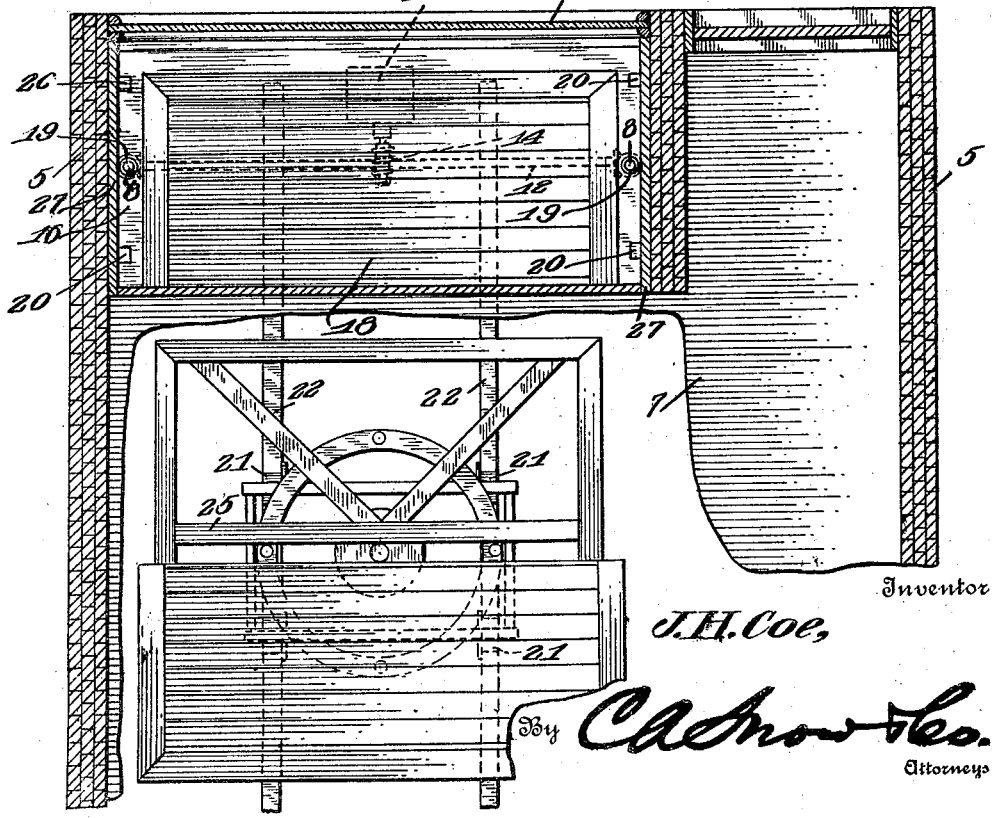
Figure 2 is a transverse sectional view through the window.

Threaded bearings 19 carry the brackets 16 and move over the threaded shafts 8 so that when the threaded shafts are operated, movement of the brackets 16 which are supported on the threaded shafts, will take place longitudinally of the shafts. Vertical guide bars 20 are arranged adjacent to the shaft 8, which bars are fitted in suitable cut out portions formed in the brackets 16 as clearly shown by Figure 2 so that the brackets will move in a true vertical plane.

As shown by Figure 1 of the drawings, the platform and brackets supporting the same have been moved to positions adjacent to the display window from a point in the basement directly under the display window.

Employed in connection with the platforms, is a truck which includes wheels 21 that move on the rails 22, the rails extending from a convenient location in the basement to a point directly under the display window, so that when the brackets 16 have been moved to their lowermost positions, the platform supported by the truck may be moved to a position to be picked up by the brackets when they are moved from the lower ends of the shafts 8.

In the present showing, the truck is formed with track 23 on which the rollers 24 move, the rollers being connected with the table 25 or body of the truck so that the body may be readily rotated. As shown, this table is relatively wide so that the same will accommodate two platforms 18 and 18' respectively whereby the platform to be removed may be positioned at one side of the truck, while the platform to be positioned, may be supported at the opposite side of the truck. With the platforms in this position, the truck may be rotated to move the platforms to positions to be engaged by the brackets and elevated in a manner as described. As shown by Figure 1 of the drawings, the platform 18 is shown as positioned on its supporting bracket, and the platform 18' is shown as positioned on the table of the truck.

In connection with the showing of the different forms of platforms, will say that these are not different forms of platforms, but in the view, Figure 1, the rear edge of the upper platform 18 is shown, while the forward edge of the plateform 18' is shown, the table of the truck having been rotated in the positioning of the platform 18.

The bracket members 16 are formed with cut out portions to accommodate the rollers 26 that contact with the plates 27 secured to the walls of the building to reduce friction between the brackets and walls and permit the bracket members to be moved readily.

In the form of the invention as illustrated by the Figures 10 and 11, the brackets indicated at 28 are formed with extensions 29 that are threaded to accommodate the threaded shafts 30 that move between the walls 31 of the guides 32. As shown by Sheet 3 of the drawings, cables are employed for raising and lowering the bracket members and in this form of the invention, the cables which are indicated at 33 have connection with the bracket members 34 formed with grooves providing flanges 34', the cables extending through suitable openings in the bracket members where they are provided with heads 35 disposed in the cut out portions 36 of the bracket members. These cables extend upwardly over the pulley 37 from where they pass downwardly over the pulleys 38, to a suitable winding drum not shown. A similar construction is shown by Figures 15 and 16 of the drawings, wherein a motor indicated at 39 is supported adjacent to the ceiling of the basement, the winding drum being indicated at 39' and connected with the motor to receive motion therefrom to wind the cables 33 thereon. The construction of the platform as shown by Figure 15 is especially designed for a bay window wherein the end thereof adjacent to the entrance of the building is formed at an angle, while in the remaining figures of the drawings, the ends of the bay window are relatively straight.

It is to be understood that in connection with the bracket members as shown by Sheets 3 and 4 of the drawings, the usual truck construction as previously described is used for delivering the platforms to the bracket members or supports.

It is believed that in view of the foregoing detail description, a further description of the device is believed unnecessary.

Having thus described the invention, what is claimed as new is:—

1. In combination with a display window and a way formed at the base thereof, vertically movable bracket members formed with inclined edges, a platform removably mounted on said members having inclined edges engaged by the inclined edges of the bracket members to restrict the platform against movement when supported on the bracket members, and means for moving the bracket members and said platform vertically in said way.

2. In combination with a display window and a way formed at the base thereof, bracket members having grooves defining flanges, a platform removably mounted on said members, said platform having grooves formed in the undersurface thereof and adjacent to the edges thereof, said grooves adapted to snugly receive the flanges to secure the platform against movement, and means cooperating with the bracket for moving the brackets and said platform vertically through the way.

3. In combination with a display window and a way formed at the base thereof, bracket members, said bracket members having laterally disposed cut out portions, and having openings communicating with the cut out portions, cables extending through the openings and having heads positioned on the lower end of the cables, said heads positioned in the cut out portions to support said bracket, a platform removably mounted on said members, and means for moving the cables to elevate the bracket members and said platform in said way.

In testimony that I claim the foregoing as my own, I have hereto affixed my signature in the presence of two witnesses.

JOSEPH H. COE.

Witnesses:
 CLARA FLAD,
 EVA PIPER.